United States Patent
Decker et al.

(10) Patent No.: US 8,758,131 B2
(45) Date of Patent: Jun. 24, 2014

(54) SYNCHRONIZING AUDIO IN A BANK OF GAMING MACHINES

(75) Inventors: Duane R. Decker, Reno, NV (US); Nicholas B. Mayne, Reno, NV (US); Lee E. Huber, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 13/592,104

(22) Filed: Aug. 22, 2012

(65) Prior Publication Data

US 2014/0057719 A1    Feb. 27, 2014

(51) Int. Cl.
   *A63F 9/24*    (2006.01)

(52) U.S. Cl.
   USPC .............. 463/35; 463/16; 463/17; 463/18; 463/19; 463/20; 463/30

(58) Field of Classification Search
   USPC .......................... 463/16–20, 30, 35
   See application file for complete search history.

(56) References Cited

U.S. PATENT DOCUMENTS

| | | | |
|---|---|---|---|
| 6,309,301 B1 | 10/2001 | Sano | |
| 6,645,073 B2 * | 11/2003 | Lemay et al. | 463/20 |
| 6,923,720 B2 * | 8/2005 | Loose | 463/16 |
| 7,479,063 B2 * | 1/2009 | Pryzby et al. | 463/35 |
| 7,758,423 B2 * | 7/2010 | Foster et al. | 463/31 |
| 8,052,511 B2 * | 11/2011 | Nakatsuka et al. | 463/7 |
| 8,545,310 B2 * | 10/2013 | Fong | 463/25 |
| 2002/0151349 A1 * | 10/2002 | Joshi | 463/20 |
| 2002/0160826 A1 * | 10/2002 | Gomez et al. | 463/16 |
| 2003/0100359 A1 * | 5/2003 | Loose et al. | 463/20 |
| 2003/0227473 A1 | 12/2003 | Shih et al. | |
| 2004/0204226 A1 * | 10/2004 | Foster et al. | 463/20 |
| 2006/0068909 A1 | 3/2006 | Pryzby et al. | |
| 2007/0213134 A1 | 9/2007 | Aida | |
| 2008/0234026 A1 * | 9/2008 | Radek | 463/16 |
| 2012/0115608 A1 | 5/2012 | Pfeifer et al. | |
| 2012/0129601 A1 * | 5/2012 | Gronkowski et al. | 463/31 |
| 2013/0150163 A1 * | 6/2013 | Radek et al. | 463/35 |

FOREIGN PATENT DOCUMENTS

| | | |
|---|---|---|
| JP | 2012-192224 A | 10/2012 |
| WO | WO-2008/087548 A2 | 7/2008 |

OTHER PUBLICATIONS

"Sound Forge Pro 10 Overview," www.sonycreativesoftware.com/soundforge, retrieved Aug. 22, 2012, 3 pages.

* cited by examiner

*Primary Examiner* — Dmitry Suhol
*Assistant Examiner* — David Duffy
(74) *Attorney, Agent, or Firm* — Foley & Lardner LLP

(57) ABSTRACT

Systems and methods for synchronizing audio in a bank of gaming machines, such as video slot and video poker machines. Audio tracks of a game may be provided to a plurality of gaming machines and synchronized. An audio track provided to one of the gaming machines may be changed to a second audio track, in response to receiving an indication of a status change for the game. The second audio track may be synchronized with the audio tracks provided to the other gaming machines in the plurality.

18 Claims, 5 Drawing Sheets

SYNCHRONIZING AUDIO IN A BANK OF GAMING MACHINES

BACKGROUND

1. Field of the Described Embodiments

The present disclosure relates generally to gaming machines, such as video poker and slot machines. The present disclosure particularly relates to synchronizing audio in a bank of gaming machines.

2. Description of the Related Art

Many of today's gaming casinos and other entertainment locations feature different single and multi-player gaming systems such as slot machines and video poker machines. The gaming machines may include a number of hardware and software components to provide a wide variety of game types and game playing capabilities. Exemplary hardware components may include bill validators, coin acceptors, card readers, keypads, buttons, levers, touch screens, coin hoppers, ticket printers, player tracking units and the like. Software components may include, for example, boot and initialization routines, various game play programs and subroutines, credit and payout routines, image and audio generation programs, various component modules and a random or pseudo-random number generator, among others.

Gaming machines are highly regulated to ensure fairness. In many cases, gaming machines may be operable to dispense monetary awards of a large amount of money. Accordingly, access to gaming machines is often carefully controlled. For example, in some jurisdictions, routine maintenance requires that extra personnel (e.g., gaming control personnel) be notified in advance and be in attendance during such maintenance. Additionally, gaming machines may have hardware and software architectures that differ significantly from those of general-purpose computers (PCs), even though both gaming machines and PCs employ microprocessors to control a variety of devices. For example, gaming machines may have more stringent security requirements and fault tolerance requirements. Additionally, gaming machines generally operate in harsher environments as compared with PCs.

In many casinos and other entertainment locations, two or more gaming machines may be deployed as part of the same bank of gaming machines. For example, video slot machines offering the same game may be placed next to one another in a casino. Deploying banks of gaming machines may increase the exposure of the game to players. A player may also be able to locate his or her favorite game more easily in a gaming environment, if the machines offering the game are located together.

In some cases, gaming machines that are located near one another and offer the same game may cause a cacophony to occur. In other words, the mixture of sounds from the game may clash when played by the various gaming machines. For example, a first gaming machine may play a portion of the background music for the game while an adjacent gaming machine plays a different portion of the background music. Players of the gaming machines may find this distracting. In another example, the status of the game at the first gaming machine may change (e.g., by entering a bonus round, while waiting for a player to interact with the game, etc.). In response to the status change, the first gaming machine may switch the audio track being played. Such a change may conflict with the audio from the other gaming machines in the bank.

Some gaming machines have been designed to reduce or eliminate clashing music by directing a game's audio only towards the game's player. For example, some gaming machines use chair speakers to direct a game's audio towards the player seated in front of the gaming machine. While this approach may reduce cacophony between gaming machines in a bank, the individual player may also feel isolated from the players of the other gaming machines. Moreover, this approach requires specialized hardware to prevent a player of one gaming machine from hearing the audio produced by any neighboring gaming machines.

SUMMARY

According to various one embodiment, a method of synchronizing audio in a bank of gaming machines is disclosed. The method includes providing, by a processing circuit, audio tracks of a game to a plurality of gaming machines. The method also includes synchronizing, by the processing circuit, the audio tracks of the game provided to the plurality of gaming machines. The method further includes receiving an indication of a status change for the game from one of the plurality of gaming machines. The method additionally includes changing an audio track provided to one of the plurality of gaming machines to a second audio track. The audio track is changed in response to receiving the indication of the status change and the second audio track remains synchronized with the audio tracks provided to the other gaming machines in the plurality.

According to another embodiment, a sound controller for a plurality of gaming machines includes a processing circuit. The processing circuit is configured to provide audio tracks of a game to a plurality of gaming machines and to synchronize the audio tracks of the game provided to the plurality of gaming machines. The processing circuit is also configured to receive an indication of a status change for the game from one of the plurality of gaming machines and to change an audio track provided to a gaming machine to a second audio track. The audio track is changed in response to receiving the indication of the status change and the second audio track remains synchronized with the audio tracks provided to the other gaming machines in the plurality.

According to a further embodiment, a system is disclosed. The system includes a first gaming machine, a second gaming machine, and a sound controller. The sound controller includes a processing circuit configured to provide a first audio track of a game to the first gaming machine and provide a second audio track of the game to the second gaming machine. The processing circuit is also configured to synchronize the first and second audio tracks and to receive an indication of a status change for the game from the first gaming machine. The processing circuit is further configured to change the first audio track provided to the first gaming machine to a third audio track of the game. The first audio track is changed in response to receiving the indication of the status change and the second and third audio tracks remain synchronized.

BRIEF DESCRIPTION OF THE DRAWINGS

The details of one or more implementations are set forth in the accompanying drawings and the description below. Other features, aspects, and advantages of the disclosure will become apparent from the descriptions, the drawings, and the claims, in which:

DETAILED DESCRIPTION

Numerous specific details may be set forth below to provide a thorough understanding of concepts underlying the described embodiments. It may be apparent, however, to one skilled in the art that the described embodiments may be practiced without some or all of these specific details. In other instances, some process steps have not been described in detail in order to avoid unnecessarily obscuring the underlying concept.

Figure 1:
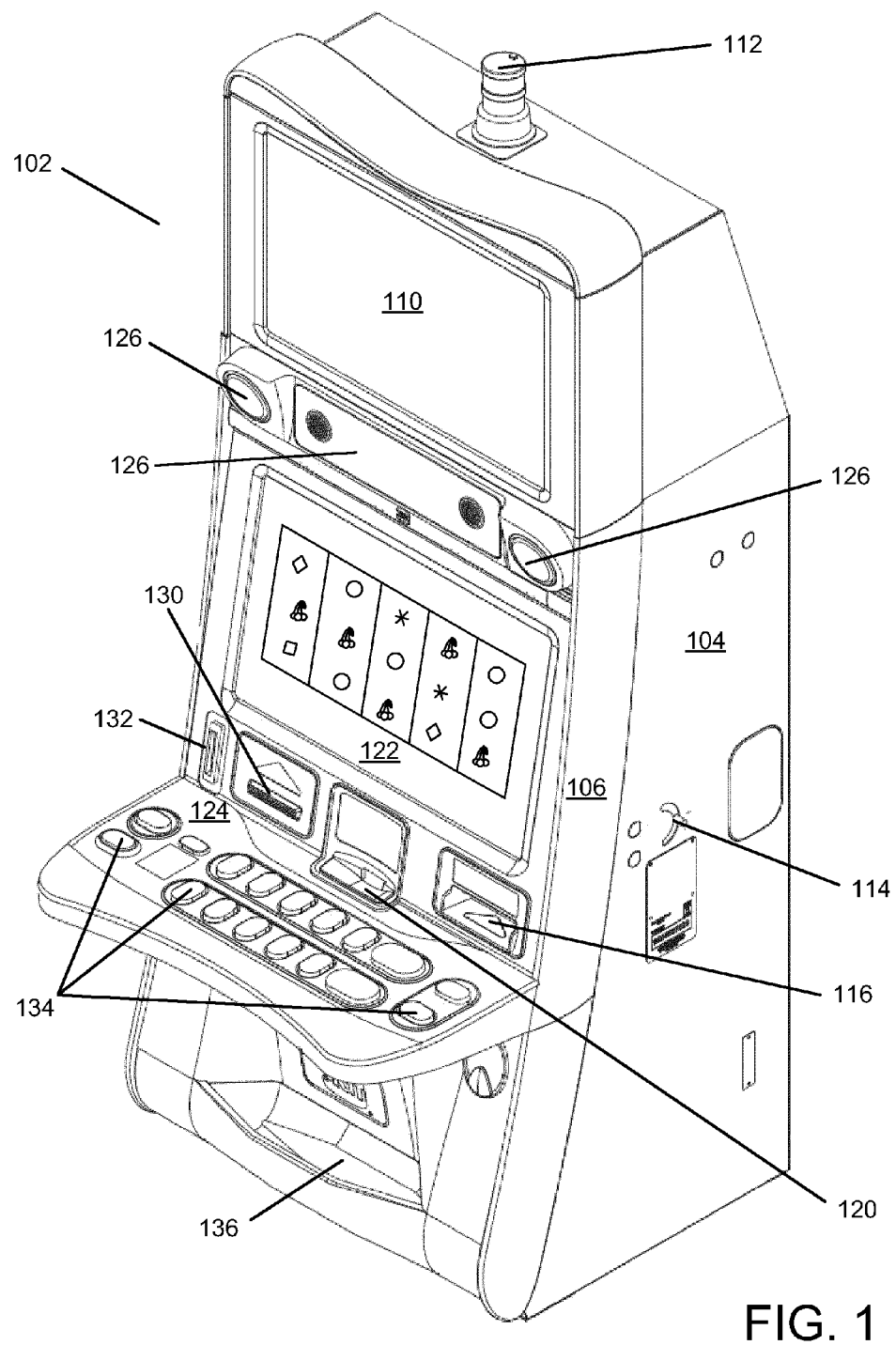
FIG. 1 is an illustration of a gaming machine, according to an exemplary embodiment.

Referring to FIG. 1, a perspective drawing of an electronic gaming machine 102 is shown in accordance with described embodiments. Gaming machine 102 may include a main cabinet 104. Main cabinet 104 may provide a secure enclosure that prevents tampering with device components, such as a game controller (not shown) located within the interior of main cabinet 104. Main cabinet 104 may include an access mechanism, such as a door 106, which allows the interior of gaming machine 102 to be accessed. Actuation of a door 106 may be controlled by a locking mechanism 114. In some embodiments, locking mechanism 114, door 106, and the interior of main cabinet 104 may be monitored with security sensors of various types to detect whether the interior has been accessed. For instance, a light sensor may be provided within main cabinet 104 to detect a change in light-levels when door 106 is opened and/or an accelerometer may be attached to door 106 to detect when door 106 is opened.

Gaming machine 102 may include any number of user interface devices that convey sensory information to a user and/or receive input from the user. For example, gaming machine 102 may include electronic displays 110, 122, speakers 126, and/or a candle device 112 to convey information to the user of gaming machine 102. Gaming machine 102 may also include a console 124 having one or more inputs 134 (e.g., buttons, track pads, etc.) configured to receive input from a user. In one embodiment, display 110 and/or display 122 may also be a touch screen display configured to receive input from a user. A controller (not shown) within gaming machine 102 may run a game, such as a wager-based game, in response to receiving input from a user via inputs 134, display 122, or display 110. For example, inputs 134 may be operated to place a wager in the game and to run the game. In response, the controller may cause reels shown on display 122 to spin, such as with a software-based slot game. In other embodiments, gaming machine 102 may include electro-mechanical reels or similar devices in addition to, or in lieu of, electronic displays. For example, display 122 alternatively may be electro-mechanical reels configured to spin as part of a slot-based game.

Gaming machine 102 may also include devices for conducting a wager-based game. For example, gaming machine 102 may include an acceptor 116 and a printer 120. In various embodiments, gaming machine 102 may be configured to run on credits that may be redeemed for money and/or other forms of prizes. Acceptor 116 may read an inserted ticket having one or more credits usable to play a game on gaming machine 102. For example, a player of gaming machine 102 may wager one or more credits within a video slot game. If the player loses, the wagered amount may be deducted from the player's remaining balance on gaming machine 102. However, if the player wins, the player's balance may be increased by the amount won. Any remaining credit balance on gaming machine 102 may be converted into a ticket via printer 120. For example, a player of gaming machine 102 may cash out of the machine by selecting to print a ticket via printer 120. The ticket may then be used to play other gaming machines or redeemed for cash and/or prizes. According to various embodiments, gaming machine 102 may record data regarding its receipt and/or disbursement of credits. For example, gaming machine 102 may generate accounting data whenever a result of a wager-based game is determined. In some embodiments, gaming machine 102 may provide accounting data to a remote data collection device, allowing the remote monitoring of gaming machine 102.

In some cases, gaming machine 102 may be configured to receive and/or dispense physical money or tokens used by the gaming establishment. For example, gaming machine 102 may include an acceptor 132 configured to receive coins or tokens. Similarly, gaming machine 102 may include a bill acceptor. For example, acceptor 116 may be configured to accept bills in addition to, or in lieu of, tickets. Money or tokens received by gaming machine 102 may be converted into game credits. In some embodiments, gaming machine 102 may be configured to dispense money or tokens via a coin hopper 136. For example, a player may cash out of gaming machine 102 by converting any remaining game credits into money or tokens dispensed via coin hopper 136. In some cases, a threshold amount may be used by gaming machine to control whether a redeemable ticket is printed by printer 120 or a payout is paid via coin hopper 136 (e.g., small payouts below a threshold dollar amount may be paid via coin hopper 136 while larger payouts are paid via a printed ticket).

In one embodiment, gaming machine 102 may include a loyalty card acceptor 130. In general, a loyalty card may be tied to a user's loyalty account. A loyalty account may store various information about the user, such as the user's identity, the user's gaming preferences, the user's gaming habits (e.g., which games the user plays, how long the user plays, etc.), or similar information about the user. A loyalty account may also be used to reward a user for playing gaming machine 102. For example, a user having a loyalty account may be given a bonus turn on gaming machine 102 or credited loyalty points for playing gaming machine 102. Such loyalty points may be exchanged for loyalty rewards (e.g., a free meal, a free hotel stay, free room upgrade, discounts, etc.).

Figure 2:
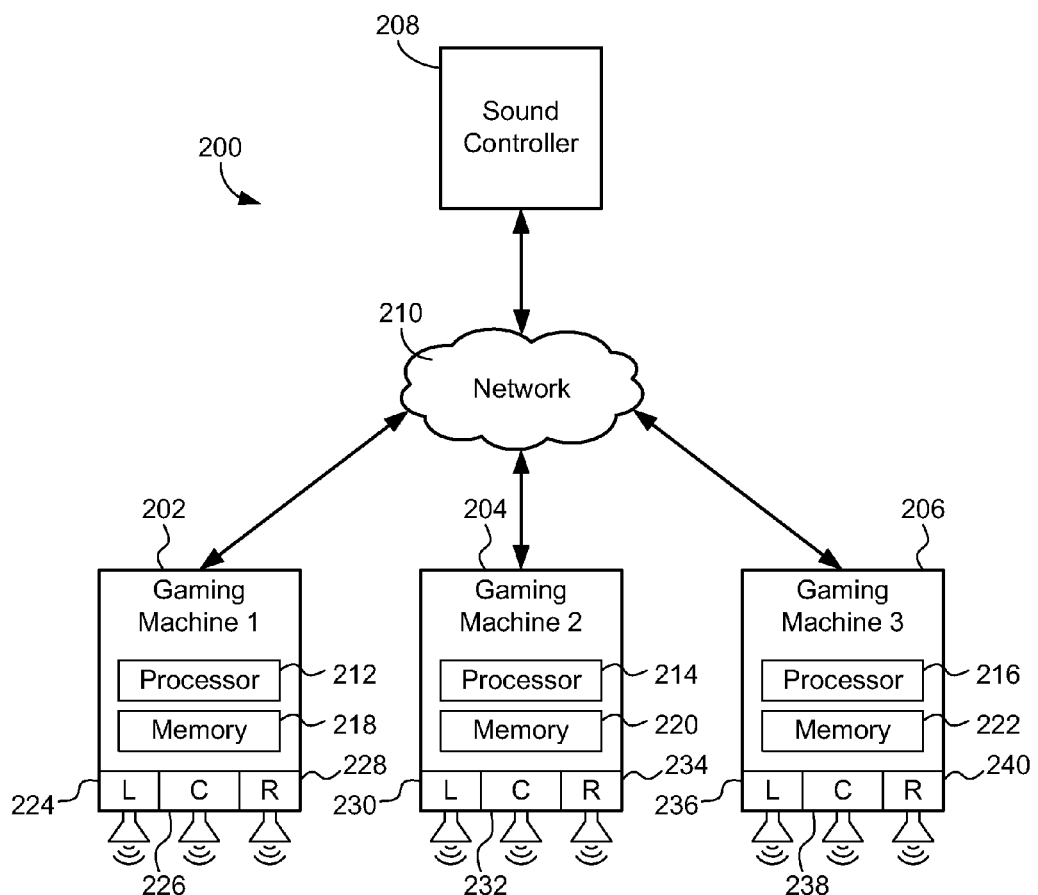
FIG. 2 is an illustration of a bank of gaming machines, according to an exemplary embodiment.

Referring now to FIG. 2, an illustration 200 of a bank of gaming machines is shown, according to an exemplary embodiment. In general, a bank of gaming machines refers to a set of two or more proximately located gaming machines. For example, gaming machines that offer the same game may be located next to one another in a casino or other gaming environment. As shown in a non-limiting example, a bank of gaming machines in a gaming environment may include three gaming machines 202-206. In other embodiments, a bank of gaming machines may include any number of two or more gaming machines (e.g., two, four, five, etc.). In the bank of gaming machines, gaming machines 202-206 may be located next to each other facing the same direction. In alternative embodiment gaming machines 202-206 may be located across from each other. For example, gaming machines 202 and 204 may be positioned to face each other separated by a short distance. In another embodiment, a bank of gaming machines 202-206 may be generally or substantially arranged around and face a central point.

Each of gaming machines 202-206 may include a processor and a memory that stores machine instructions executable by the processor, i.e., as part of a processing circuit. For example, gaming machines 202-206 may include processors 212-216, respectively. Similarly, gaming machines 202-206 may include memories 218-222 that store machine instructions executable by processors 212-216. Memories 218-222 may store one or more games that are playable on gaming machines 202-206. For example, gaming machines 202-206 may be configured to play a video slot or video poker game. The gaming machines 202-206 may have the same games or different games installed on each of them. A game playable on gaming machines 202-206 may be a thick client game or a thin client game, according to various embodiments. Generally, a thick client game includes all of the logic for the game, including its outcome-determining logic. In contrast, some or all of the logic for a thin client game may be stored and executed by another computing device. For example, a remote server may determine the outcome of a thin client game and provide the results to gaming machine 202.

According to various embodiments, gaming machines 202-206 may communicate via a network 210 with a sound controller 208. Network 210 may be any form of communications network that conveys data between gaming machines 202-206. Network 210 may include any number wired or wireless connections. For example, sound controller 208 may communicate over a wired connection that includes a serial cable, a fiber optic cable, a CAT5 cable, a data bus, or any other form of wired connection. Similarly, sound controller 208 may communicate via a wireless connection (e.g., via WiFi, cellular, radio, etc.) with gaming machines 202-206. Network 210 may also include any number of intermediary networking devices, such as routers, switches, servers, etc. In some embodiments, gaming machines 202-206 may also communicate with one another via network 210. For example, gaming machines 202-206 may communicate data between one another via network 210, to allow players of gaming machines 202-206 to collaborate within a multi-player game.

Sound controller 208 may be one or more computing devices configured to coordinate and synchronize the audio of a game playable on gaming machines 202-206. According to various embodiments, sound controller 208 may be located proximately to gaming machines 202-206, remotely within a data center of gaming environment, or in a separate location from the gaming environment. For example, sound controller 208 may coordinate the audio of a thin client game being played on gaming machines 202-206 and provide the audio to gaming machines 202-206 via the Internet. In some embodiments, sound controller 208 may be distributed and integrated into gaming machines 202-206 themselves. For example, software installed in memory 218 of gaming machine 202 may coordinate and synchronize the audio across gaming machines 202-206.

Sound controller 208 may control one or more speakers of gaming machines 202-206. Each of gaming machines 202-206 may include any number of speakers. For example, gaming machine 202 may include a left speaker 224, a center speaker 226, and a right speaker 228. Similarly, gaming machines 204-206 may include left speakers 230, 236, center speakers 232, 238, and right speakers 234, 240, respectively. Sound controller 208 may provide any number of audio tracks for a game to speakers 224-240. For example, sound controller 208 may play a first audio track of the game via center speaker 226 of gaming machine 202, a second audio track of the game via center speaker 232 of gaming machine 204, and a third audio track of the game via center speaker 238 of gaming machine 206. In general, a track refers to the background music and other sounds played periodically within a game. In an alternate embodiment, sound controller 208 may play the same audio track or separate channels of the same audio track on the center speakers 226, 232, and 238 of respective gaming machines 202, 294 and 206.

In addition to audio tracks, a game may include special gameplay-specific audio, such as sound effects. For example, a "jackpot" sound effect may be played by gaming machine 202 whenever a jackpot is hit. In some embodiments, gaming machines 202-206 may control the playing of gameplay-specific audio. For example, gameplay-specific audio may be channeled through the left and right speakers 224, 228, 230, 234, 236, and 240 of gaming machines 202-206, respectively, while background music for the game is controlled by sound controller 208.

Sound controller 208 may synchronize the audio tracks provided to speakers 224-240, in various embodiments. In some embodiments, sound controller 208 may coordinate the audio tracks provided to speakers 224-240 such that each audio track plays at the same point in time in the tracks. For example, a first track may be played at gaming machine 202 at a playback time position of 2 minutes and 13 seconds, while a second track may be played by gaming machine 206 at a playback time position of 2 minutes and 13 seconds. In various embodiments, audio tracks synchronized by sound controller 208 may be synchronized down to the microsecond or smaller level. In some embodiments, audio tracks for the game playable on gaming machines 202-206 may have equal lengths of time. For example, audio tracks in the game may each be approximately three to five minutes long. In other embodiments, the length of the tracks may have different lengths, be shorter, or may be a fraction of the length of a longer track or longest track.

According to various embodiments, sound controller 208 may switch audio tracks for one or more of gaming machines 202-206, in response to receiving an indication of a game status change. In some embodiments, the game playable on gaming machines 202-206 may include a plurality of audio tracks for different states of game play. For example, the game may have four states of play: a base state, a waiting state (e.g., the game is waiting for a player interaction), a first bonus round state, and a second bonus round state. Each state of the game may have a corresponding audio track. In some embodiments, the different tracks of the game may be variations of the same song. For example, the song may be played at different intensities in the base state and during the bonus rounds. Similarly, a percussive version of the song may be played while the game is waiting for interaction from the player. When an indication of a status change is received from one of gaming machines 202-206, sound controller 208 may switch or signal a change to modify the provided audio track to the corresponding audio track and at the same playback position as the previous track. For example, the game at gaming machine 204 may enter a bonus round from the base game. In such a case, sound controller 208 may change the base audio track at position 2 m:15 s:03 ms to the bonus audio track at position 2 m:15 s:03 ms. Alternatively, sound controller 208 may layer or instruct the gaming machines 202-206 to layer the base audio track at position 2 m:15 s:03 ms with the bonus audio track at position 2 m:15 s:03 ms and play both tracks simultaneously.

In some embodiments, the game playable via gaming machines 202-206 may include a group play mode. In a group play mode, players of gaming machines 202-206 may collaborate in-game to achieve a certain collective goal or earn bonuses. For example, players of a slot-based game may receive bonus spins if every player participates in a group play bonus round. During a group play mode, sound controller 208 may provide the same audio track of the game to gaming machines 202-206. For example, sound controller 208 may treat speaker 226 of gaming machine 202 as a left speaker, speaker 232 of gaming machine 204 as a center speaker, and speaker 238 of gaming machine 206 as a right speaker for the group play audio track. In other words, sound controller 208 may cause gaming machines 202-206 to play the same audio track collectively.

Figure 3:
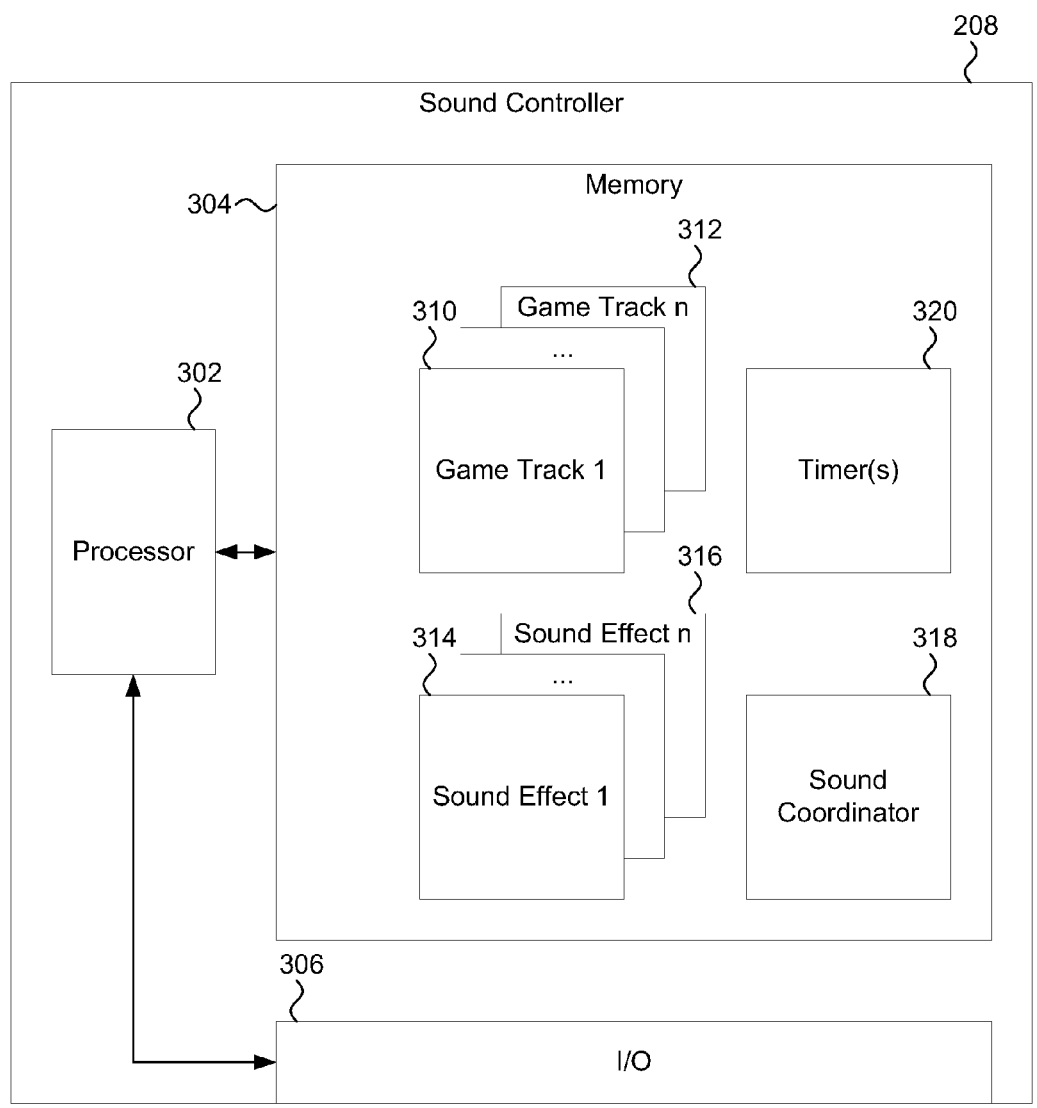
FIG. 3 is a block diagram of a sound controller for a bank of gaming machines, according to an exemplary embodiment.

Referring now to FIG. 3, a block diagram of a sound controller 208 for a bank of gaming machines is shown, according to an exemplary embodiment. Sound controller 208 may be configured to control the audio for any number of gaming machines. For example, sound controller 208 may control the audio for a first bank of gaming machines offering a slot-based game and for a second bank of gaming machines offering a video blackjack game. In some embodiments, sound controller 208 may be a separate computing device from the controlled gaming machines. In other embodiments, sound controller 208 may be part of one or more of the controlled gaming machines. For example, sound controller 208 may be part of a first gaming machine in a bank of machines that controls the audio of the other gaming machines in the bank. In further embodiments, sound controller 208 may be configured to coordinate the audio for multiple banks of gaming machines. In such cases, sound controller 208 may synchronize the audio across all banks playing the same game or may synchronize each controlled bank individually (e.g., the audio for gaming machines in a first bank may be synchronized independently from the audio for gaming machines in a second bank).

Sound controller 208 may include a processor 302 and a memory 304. Memory 304 stores machine instructions that, when executed by processor 302, cause processor 302 to perform one or more operations described herein. Processor 302 may include a microprocessor, FPGA, ASIC, any other form of processing electronics, or combinations thereof. Memory 304 may be any electronic storage medium such as, but not limited to, a floppy disk, a hard drive, a CD-ROM, a DVD-ROM, a magnetic disk, RAM, ROM, EEPROM, EPROM, flash memory, a solid state drive, optical memory, or combinations thereof. Memory 304 may be a tangible storage medium that stores non-transitory machine instructions. Sound controller 208 may include any number of processors and memories. In other words, processor 302 may represent the collective processing devices of sound controller 208 and memory 304 may represent the collective storage devices of sound controller 208. Processor 302 and memory 304 may be on the same printed circuit board or may be in communication with each other via a bus or other form of connection.

Sound controller 208 may include input and output (I/O) hardware 306 in communication with processor 302. I/O hardware 306 includes the interface hardware used by sound controller 208 to receive data from other devices and/or to provide data to other devices. For example, a command may be sent from sound controller 208 to gaming machine 202 via I/O hardware 306. I/O hardware 306 may include, but is not limited to, hardware to communicate on a local system bus and/or on a network. For example, I/O hardware 306 may include a port to transmit display data to an electronic display and another port to receive data from sound controller 208 via a network, such as network 210 shown in FIG. 2. In some embodiments, I/O hardware 306 may be directly hardwired to a speaker of a gaming machine (e.g., sound controller is local to the gaming machine) or speakers of multiple gaming machines (e.g., sound controller is local to the bank of gaming machines).

Memory 304 may include any number of audio tracks 310-312 for a game (e.g., a first through nth audio track for a game). In some embodiments, audio tracks 310-312 may correspond to different states of play for the game. For example, audio tracks 310-312 may include tracks for various states of the game, such as a normal round, a bonus round, a waiting state, or the like. Audio tracks 310-312 may also include audio tracks for a group play mode, where players of a bank of gaming machines collaborate in-game. In some cases, audio tracks 310-312 may include audio files specific to each gaming machine or a speaker of each gaming machine. For example, audio tracks 310-312 may include audio tracks for different game states to be played by different speakers in the bank of gaming machines. In other embodiments, audio tracks 310-312 may be stored separately from sound controller 208, such as in a separate memory of a gaming machine.

Audio tracks 310-312 may include audio tracks for multiple games playable by the gaming machines in a bank of gaming machines. For example, audio tracks 310-312 may include audio tracks for a video poker game and a video slot game playable by the gaming machines in a bank. Thus, the game available to players at the bank may be changed (e.g., in response to a request from the players, by an operator of the gaming establishment, etc.). In further embodiments, audio tracks 310-312 may include audio tracks for games playable by different banks of gaming machines. For example, audio tracks 310-312 may include audio tracks for a video poker game available at a first bank of gaming machines and audio tracks for a video slot game available at a second bank of gaming machines.

In various embodiments, some or all of audio tracks 310-312 for a game may have the same length of playtime. For example, audio tracks 310-312 may each be two minutes long, three minutes long, or have any other common length of playtime. Some or all of audio tracks 310-312 may be variants of the same song, in some embodiments. For example, audio track 312 may be a percussive version of the instrumental song in audio track 310. In other words, audio tracks 310-312 may have the same tempo, key, chord progression, and/or length, but may have different intensities, volumes, instruments, voices, etc. In some embodiments, an audio track may be looped continuously. In further embodiments, audio tracks 310-312 may be of different play lengths or may include audio tracks that are set fractions of one another (e.g., a shorter track is one half, one fourth, one eighth, etc. of a longer track).

Memory 304 may include any number of game sound effects 314-316 (e.g., a first through nth sound effect for a game or set of games). In contrast to audio tracks 310-312, sound effects 314-316 may only be played at certain points in time during game play. For example, sound effect 314 may be an alert that is played when a player hits a jackpot. Sound effects 314-316 may be played concurrently with audio tracks 310-312 or may interrupt the play of an audio track, in various embodiments. For example, an audio track for a bonus round may be played at the same time as a jackpot sound effect. Similar to audio tracks 310-312, game sound effects 314-316 may also be stored in a separate memory from sound controller 208, according to some embodiments. In such cases, sound controller 208 may provide control signals to a running game to control which audio tracks or sound effects are played.

Memory 304 may include one or more timers 320 configured to maintain a common playback count for audio tracks 310-312. In various embodiments, a single timer may control the playback of audio tracks 310-312 for multiple gaming machines (e.g., within a bank of gamine machines or across multiple banks) or each gaming machine may have its own corresponding timer. In some embodiments, each of the one or more timers 320 may maintain a count based on a hardware-based oscillator in processor 302. For example, an oscillator crystal in processor 302 may oscillate at a particular frequency. Based on the frequency of the oscillations, the one or more timers 320 may update the playback count for audio tracks 310-312. For example, a timer may be used to determine that one of audio tracks 310-312 has been playing for one minute and ten seconds on a gaming machine.

Memory 304 may also include a sound coordinator 318 configured to synchronize and coordinate the playing of audio tracks 310-312 and sound effects 314-416 for a bank of gaming machines. In various embodiments, sound coordinator 318 may use the one or more timers 320 to maintain a common playback time for audio tracks 310-312 provided to the gaming machines. A playback time refers to the time position within an audio track. For example, an audio track that is four minutes long and has been playing for one minute, thirty five seconds, and four milliseconds may have a current playback time of 1 m:35 s:04 ms/4 m:00 s:00 ms. In one example of a common playback time, assume that sound controller 208 controls the audio tracks for a bank of three gaming machines. Sound coordinator 318 then may provide audio tracks 310-312 to the gaming machines that are all at the same playback time (e.g., if one track is at 1 m:35 s: 10 ms, all tracks are). At the end of an audio track, sound coordinator 318 may repeat the playback of the track, i.e., the track may be continuously looped until a game status change is detected. In embodiments in which audio tracks 310-312 have the same playback length, the audio tracks looped by sound coordinator 318 may retain the same playback times. In other embodiments, sound coordinator 318 may switch an audio track when the track reaches its end. In cases in which sound coordinator 318 coordinates the playback of audio tracks that differ in playback length, sound coordinator 318 may loop a shorter track n-number of times such its total time being played is equal to the playback length of the longer track. For example, a shorter track that is one quarter the playback length of a longer track may be looped four times, to synchronize its playback with the longer track.

In some embodiments, sound coordinator 318 may receive an indication of a game status change via I/O hardware 306 from a gaming machine or another computing device (e.g., a remote server that provides a thin client game to a gaming machine, a server that monitors gaming machines, etc.). In general, a game status change may correspond to a change in the state of the game. For example, an indication of a game status change may indicate that the game has entered a bonus round at one of the gaming machines. In another example, an indication of a game status change may indicate that the game is entering a group play mode.

Sound coordinator 318 may change an audio track provided to a gaming machine, in response to receiving the indication of a game status change. For example, sound coordinator 318 may change an audio track for a normal round to an audio track for a bonus round, in response to receiving an indication that a bonus round is being entered on one of the gaming machines. In another example, a game may request a particular audio track from sound coordinator 318 (e.g., a gaming machine may locally determine which audio track is to be played and request that sound coordinator 318 coordinate its playing with tracks provided to the other gaming machines). In various embodiments, sound coordinator 318 may begin the new audio track at the same playback time as the previous audio track. For example, if the audio track for the normal round is at 1 m:45 s when the track change is effected, sound coordinator 318 may begin the audio track for the bonus round at 1 m:45 s or thereabouts (e.g., to account for processing or network delays).

In one embodiment, sound coordinator 318 may begin playing one of audio tracks 310-312 or a first channel of the audio track on the center speaker of a first gaming machine (e.g., center speaker 226 of gaming machine 202), a second audio track on the center speaker of a second gaming machine (e.g., center speaker 232 on second gaming machine 204), and a third audio track on the center speaker of a third gaming machine (e.g., center speaker 238 of the third gaming machine 206). At a point later in time or based on a triggering event, sound coordinator 318 may shift the playing of each track such that the first audio track or first channel of the audio track is then played on the center speaker of the second gaming machine, the second audio track is played on the center speaker of the third gaming machine, and the third audio track is played on the center speaker of the first gaming machine.

In other embodiments, audio tracks 310-312 and/or sound effects 314-316 may reside on another device as sound coordinator 318 and timer 320. For example, audio tracks 310-312 may reside in the memory of a gaming machine or a server that provides a thin client game to a gaming machine. In such cases, sound coordinator 318 may alternatively receive indications of the playback time of the audio tracks and coordinate the playing of the tracks. In some embodiments, sound coordinator 318 may provide a control command to the device on which the audio track resides to cause the device to change tracks, in response to receiving an indication of a game status change. The control command may cause the device to change the audio track to another track at the same or similar playback time as the original track. In further embodiments, sound coordinator 318 and timer 320 may be loaded to a gaming machine in a bank of gaming machines and coordinate the audio tracks played by the bank. In yet a further embodiment, sound coordinator 318 and timer 320 may be loaded to two or more gaming machines in the bank and executed in a redundant manner (e.g., a second gaming machine in the bank may take over the audio track coordination if a first gaming machine encounters an error).

Figure 4:
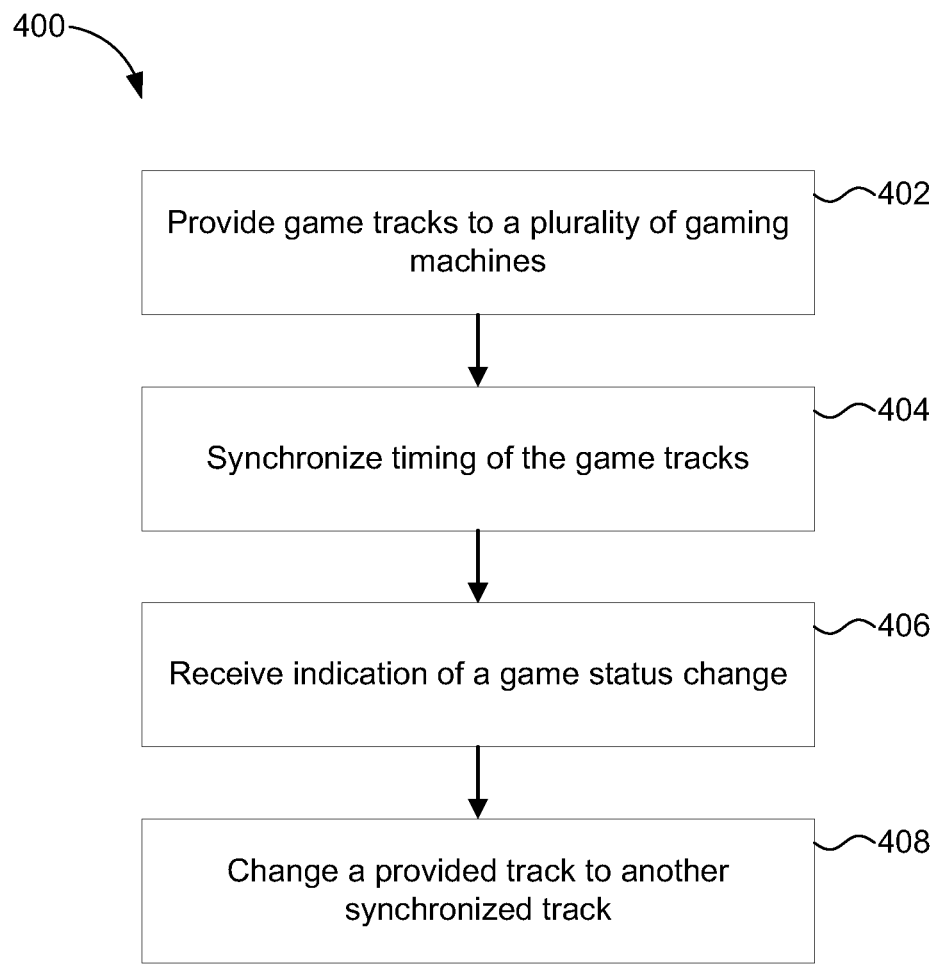
FIG. 4. is a flow diagram of a process for synchronizing audio in a bank of gaming machines, according to an exemplary embodiment.

Referring now to FIG. 4, a process 400 for synchronizing audio in a bank of gaming machines is shown, according to an exemplary embodiment. Process 400 may be implemented by one or more processing circuits configured to store and execute machine instructions. For example, process 400 may be implemented by a sound controller, a gaming machine, a remote server in communication with a bank of gaming machines, combinations thereof, or similar computing devices. In general, process 400 reduces and/or eliminates cacophony among the gaming machines in the bank without audibly isolating a player of one gaming machine from the other machines in the bank.

Process 400 includes providing game tracks to a plurality of gaming machines (block 402). The plurality of gaming machines may be part of a bank of gaming machines. For example, the gaming machines may be proximately located. In various embodiments, the game tracks may correspond to variations of the same song of a game playable at the plurality of gaming machines. For example, the audio tracks may have varying intensities, volumes, instruments, voices, or other similar characteristics. However, the audio tracks may still have the same tempo, key, or chord progression. In some embodiments, the audio tracks may have the same play lengths. For example, each of the variations of the song may be three minutes long.

Process 400 includes synchronizing the timing of the game's audio tracks provided to the gaming machines (block 404). In some embodiments, the audio tracks provided to the gaming machines may be synchronized such that they each have the same current playback time. For example, the audio tracks provided to the gaming machines may all be at playback time 2 m:34 s:15 ms. At the end of the audio tracks, the audio tracks may be looped such that they each begin again at the same time. In other cases, audio tracks corresponding to variations of a different song may be provided at the same time, when the first set of audio tracks end.

Process 400 includes receiving an indication of a game status change (block 406). A game status change may be, but is not limited to, a change in the level, stage, or round of the game, a change to or from a state in which the game is waiting for an interaction with the player, a change to or from a bonus level, stage, or round, or a change to or from a group play mode. The indication may be received from a gaming machine running the game, a game server that provides a thin client game to a gaming machine, or another computing device having access to the current state of the game being played on a gaming machine. For example, a gaming machine may provide an indication that a bonus round has been entered.

Process 400 includes changing a track provided to a gaming machine to another synchronized track (block 408). In response to receiving a game status change, the audio track for the game being provided to the gaming machine may be changed to another audio track for the game. In various embodiments, the new audio track may be synchronized to the audio tracks provided to the other gaming machines by providing the new track at the same playback time as the other tracks. For example, assume that the audio tracks provided to a bank of gaming machines are at playback time 2 m:10 s:30 ms:16 μs, when an indication is received that the first gaming machine has entered a bonus round. In such a case, the audio track provided to the first gaming machine may be changed to a track that corresponds to the bonus round. The bonus round track may also be provided to the gaming machine at playback time 2 m:10 s:30 ms:16 μs, to match that of the audio tracks provided to the other gaming machines. Thus, the new track may harmonically mesh with the other tracks, so as not to create a discordant mixture of sounds from the gaming machines.

Figure 5:
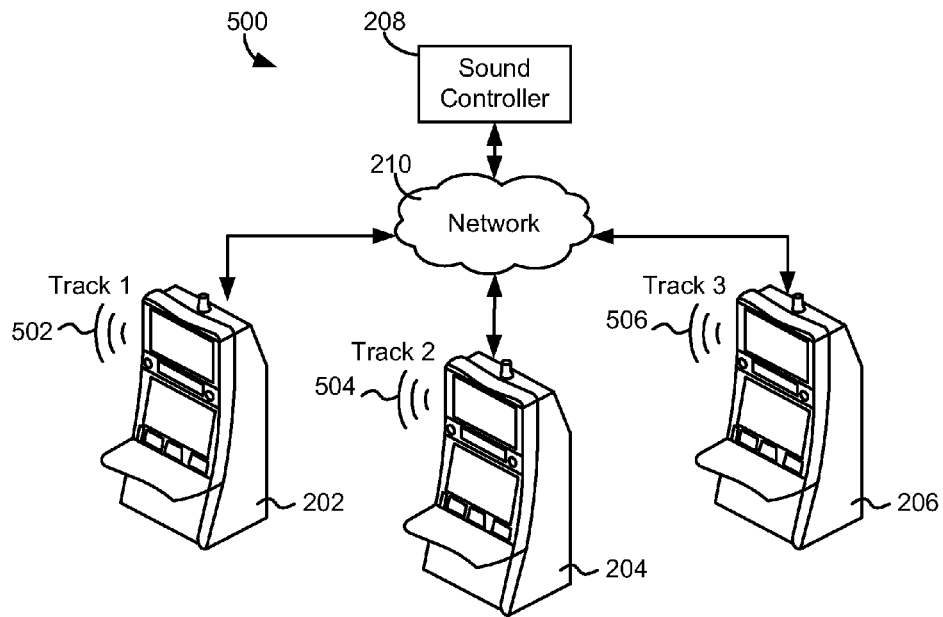
FIG. 5 is an example illustration of a bank of gaming machines being played in a connected play mode, according to an exemplary embodiment.

Referring now to FIG. 5, an example illustration 500 of a bank of gaming machines being played in a connected play mode is shown, according to an exemplary embodiment. In a connected play mode, players may play the game independently of one another. Therefore, the gaming machines in the bank may or may not be in the same stages of game play. For example, the game may be in a normal state of play on a first gaming machine in the bank and in a waiting state on a second gaming machine in the bank.

In the example shown in illustration 500, assume that the game playable on gaming machines 202-206 is in a different state on each of the machines. For example, the game may be in a normal state of play on gaming machine 202, in a waiting state of play on gaming machine 204, and in a bonus round on gaming machine 206. In such a case, each of gaming machines 202-206 may play a different audio track for the game. For example, gaming machine 202 may play an audio track 502 that corresponds to the game's normal state, gaming machine 204 may play an audio track 504 that corresponds to a waiting state in the game, and gaming machine 206 may play an audio track 506 that corresponds to a bonus round in the game.

Each of audio tracks 502-506 may be variations of the same song, according to various embodiments. In other words, audio tracks 502-506 may share the same tempo, key, and chord progression. However, the instruments, voices, etc., used within audio tracks 502-506 may differ. For example, audio track 502 may be a musical track that includes brass, woodwind, and percussion instruments. Audio track 504, however, may be a musical track that only include percussion to signify to a player of gaming machine 204 that the game is waiting for the player's next move. In some embodiments, audio tracks 502-506 may be of the same length.

Sound controller 208 may synchronize and coordinate the audio tracks being played by gaming machines 202-206. In various embodiments, sound controller 208 may time audio tracks 502-506 such that their current playback times match. For example, audio tracks 502-506 may be synchronized by sound controller 208 such that their current times are each at 2 m:21 s:36 ms. When the end of audio tracks 502-506 is reached, sound controller 208 may loop the audio tracks or begin providing new audio tracks (e.g., audio tracks associated with a different song) that are synchronized.

According to various embodiments, sound controller 208 may receive an indication of a game status change from one of gaming machines 202-206. For example, gaming machine 204 may return from a waiting state to a normal state of play, if its player interacts with the game. In such a case, gaming machine 204 may provide an indication of the status change to sound controller 208. In response, sound controller 208 may change audio track 504 provided to gaming machine 204 to audio track 502 (e.g., an audio track that corresponds to a normal state of play in the game). Sound controller 208 may coordinate the new track provided to gaming machine 204 such that its playback time coincides with that of the audio tracks provided to gaming machines 202, 206.

Sound controller 208 may provide any number of audio tracks to gaming machines 202-206. In one example, assume that each of gaming machines 202-206 has a center speaker (e.g., center speakers 226, 232, 238 shown in FIG. 2) and that sound controller 208 treats these speakers as a left speaker, a center speaker, and a right speaker, respectively. In such a case, each of audio tracks 502-506 may have a separate audio file for each speaker being controlled by sound controller 208. For example, a quad file (e.g., a four channel audio file) may be created for each speaker being controlled. To control the center speaker of gaming machine 202, a first quad file may have the audio track saved under the left speaker channel. Similarly, to control the center speaker of gaming machine 206, a second quad file may have the audio track saved under the right speaker channel. To control the center speaker of gaming machine 204, a third quad file may have the audio track saved under the left-rear channel of the quad file. Thus, each audio track provided by sound controller 208 may have three separate files corresponding to speakers at gaming machines 202-206. For example, if the game has four tracks synchronized by sound controller 208 (e.g., a base track, a waiting track, and two bonus round tracks), sound controller 208 may store twelve separate quad files. In response to receiving an indication of a game status change, sound controller 208 may change the provided audio track for the corresponding speaker or speakers of the gaming machine.

Any number of sound files may be stored by sound controller 208. For example, sound controller may store a single sound file that includes audio data for a plurality of speaker channels (e.g., a left channel, a right channel, etc.). Sound controller 208 may then use the sound file to control speakers across a bank of gaming machines or multiple speakers of the same gaming machine. In other embodiments, each gaming machine in a bank and/or each speaker of a gaming machine may have a separate sound file on sound controller 208 for each audio track of the games.

Figure 6:
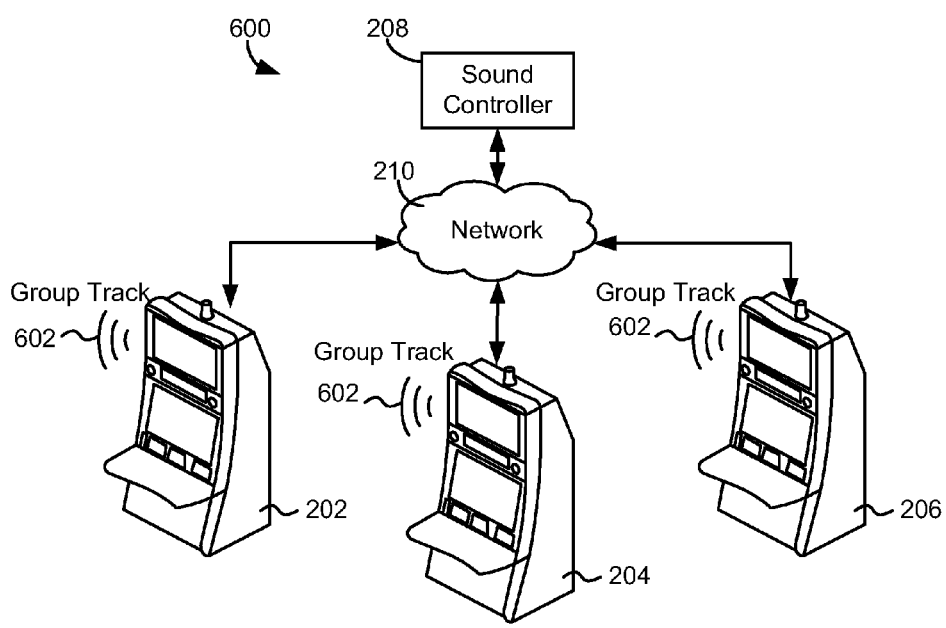
FIG. 6 is an example illustration of a bank of gaming machines being played in a group play mode, according to an exemplary embodiment.

Referring now to FIG. 6, an example illustration 600 of a bank of gaming machines being played in a group play mode is shown, according to an exemplary embodiment. In a group play mode, the game may allow multiple players to collaborate in-game across a bank of gaming machines 202-206. For example, a bonus round in the game may be played in a group play mode, to encourage players to participate. In other words, the game may appear to "take over" the individual machines in the bank of gaming machines.

In response to receiving an indication of a group play mode being entered, sound controller 208 may provide the same audio track 602 of the game to gaming machines 202-206. Sound controller 208 may synchronize and coordinate the playing of audio track 602. Since the same track is played by each of gaming machines 202-206 it may be louder and attract more players to participate in the group play. In some embodiments, sound controller 208 may use a single audio quad file to provide track 602 to gaming machines 202-206. For example, the quad file may deliver a three channel mix across the center speakers of gaming machines 202-206. In response to receiving an indication that the group play mode has ended, sound controller 208 may then change the audio tracks provided to gaming machines 202-206 accordingly. For example, gaming machine 202 may be provided an audio track corresponding to a normal game state, while gaming machine 202 may be provided an audio track corresponding to a waiting game state.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular embodiments. Certain features that are described in this specification in the context of separate implementations or embodiments can also be implemented in combination in a single implementation. Conversely, various features that are described in the context of a single implementation or embodiment can also be implemented in multiple implementations or embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of synchronizing audio in a bank of gaming machines comprising:
   providing, by a processing circuit, a first audio track of a game to a first gaming machine and a second audio track of the game to a second gaming machine,
   synchronizing, by the processing circuit, the first and second audio tracks of the game provided to the first and second gaming machines;
   receiving an indication of a status change for the game from the first gaming machine; and
   changing the first audio track provided to the first gaming machine to a third audio track, wherein the first audio track is changed in response to receiving the indication of the status change, wherein the third audio track remains synchronized with the second audio track provided to the second gaming machine, wherein the first, second, and third audio tracks correspond to variations of the same song and have the same playback lengths, and wherein the first audio track corresponds to the game being in a normal state of gameplay, the second audio track corresponds to the game being in a waiting state, and the third audio track corresponds to the game being in a bonus round of gameplay.

2. The method of claim 1, wherein each variation of the song has the same tempo, key, and chord progression.

3. The method of claim 1, wherein a current playback time of the first audio track provided to the first gaming machine is equal to a current playback time of the second audio track provided to the second gaming machine.

4. The method of claim 1, wherein the indication of the status change corresponds to the game entering a bonus round at the first gaming machine.

5. The method of claim 1, further comprising:
   providing the same audio track to the plurality of gaming machines, in response to receiving an indication of the game entering a group play mode.

6. A sound controller for a plurality of gaming machines comprising a processing circuit configured to:
   provide a first audio track of a game to a first gaming machine and a second audio track of the game to a second gaming machine,
   synchronize the first and second audio tracks of the game provided to the first and second gaming machines;
   receive an indication of a status change for the game from the first gaming machine; and
   change the first audio track provided to the first gaming machine to a third audio track, wherein the first audio track is changed in response to receiving the indication of the status change, wherein the third audio track remains synchronized with the second audio track provided to the second gaming machine, wherein the first, second, and third audio tracks correspond to variations of the same song and have the same playback lengths, and wherein the first audio track corresponds to the game being in a normal state of gameplay, the second audio track corresponds to the game being in a waiting state, and the third audio track corresponds to the game being in a bonus round of gameplay.

7. The sound controller of claim 6, wherein each variation of the song has the same tempo, key, and chord progression.

8. The sound controller of claim 6, wherein a current playback time of the first audio track provided to the first gaming machine is equal to a current playback time of the second synchronized audio track provided to the second gaming machine.

9. The sound controller of claim 6, wherein the indication of the status change corresponds to the game entering a bonus round at the first gaming machine.

10. The sound controller of claim 6, wherein the processing circuit is configured to:
provide the same audio track to the first and second gaming machines, in response to receiving an indication of the game entering a group play mode.

11. A computer-readable storage medium having machine instructions stored therein, the instructions being executable by a processor to cause the processor to perform operations comprising:
providing a first audio track of a game to a first gaming machine and a second audio track of the game to a second gaming machine,
synchronizing the first and second audio tracks of the game provided to the first and second gaming machines;
receiving an indication of a status change for the game from the first gaming machine; and
changing the first audio track provided to the first gaming machine to a third audio track, wherein the first audio track is changed in response to receiving the indication of the status change, wherein the third audio track remains synchronized with the second audio track provided to the second gaming machine, wherein the first, second, and third audio tracks correspond to variations of the same song and have the same playback lengths, and wherein the first audio track corresponds to the game being in a normal state of gameplay, the second audio track corresponds to the game being in a waiting state, and the third audio track corresponds to the game being in a bonus round of gameplay.

12. The computer-readable storage medium of claim 11, wherein each variation of the song has the same tempo, key, and chord progression.

13. The computer-readable storage medium of claim 11, wherein a current playback time of the first audio track provided to the first gaming machine is equal to a current playback time of the second audio track provided to the second gaming machine.

14. The computer-readable storage medium of claim 11, wherein the indication of the status change corresponds to the game entering a bonus round at the first gaming machine.

15. The computer-readable storage medium of claim 11, wherein the operations comprise:
providing the same audio track to the plurality of gaming machines, in response to receiving an indication of the game entering a group play mode.

16. A system comprising:
a first gaming machine;
a second gaming machine; and
a sound controller comprising a processing circuit configured to:
provide a first audio track of a game to the first gaming machine;
provide a second audio track of the game to the second gaming machine;
synchronize the first and second audio tracks;
receive an indication of a status change for the game from the first gaming machine; and
change the first audio track provided to the first gaming machine to a third audio track of the game; wherein the first audio track is changed in response to receiving the indication of the status change, and wherein the second and third audio tracks remain synchronized, wherein the first, second, and third audio tracks have the same playback lengths, wherein the first, second, and third audio tracks correspond to variations of the same song, and wherein the first audio track corresponds to the game being in a normal state of gameplay, the second audio track corresponds to the game being in a waiting state, and the third audio track corresponds to the game being in a bonus round of gameplay.

17. The system of claim 16, wherein each variation of the song has the same tempo, key, and chord progression.

18. The system of claim 16, wherein the processing circuit is configured to:
provide the same audio track to the plurality of gaming machines, in response to receiving an indication of the game entering a group play mode.

* * * * *